Jan. 17, 1928.  F. SCHUTZE  1,656,833
INFANT'S SOOTHER
Filed Sept. 30. 1926

INVENTOR
FREDERICK SCHUTZE.

By

Attorney

Patented Jan. 17, 1928.

1,656,833

UNITED STATES PATENT OFFICE.

FREDERICK SCHUTZE, OF LONDON, ENGLAND.

INFANT'S SOOTHER.

Application filed September 30, 1926, Serial No. 138,746, and in Great Britain July 1, 1926.

This invention relates to infants' soothers comprising a teat of india-rubber or the like attached to a shield or surrounding member made of bone, metal or other material.

The object of the present invention is to provide improved and simplified means for securing the teat to the shield or surrounding member and for attaching a cord to the soother whereby the said teat cannot become inadvertently detached while in use, and whereby the india-rubber is relieved of strain or compression tending to tear or injure the same.

Figure 1 of the accompanying drawings is a part-sectional view through a teat in which the guard is attached in accordance with this invention.

The same reference numerals indicate corresponding parts in each of the figures.

Figure 1:
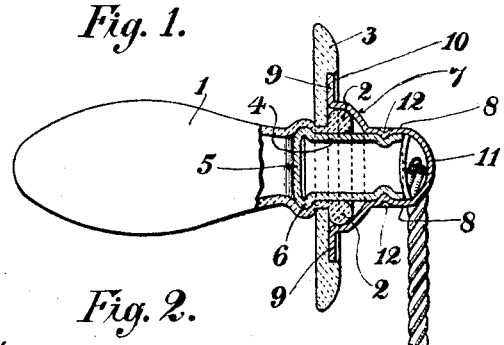
Figure 2:
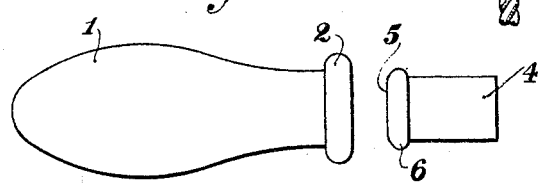
Figure 2 is an elevational view of the teat and of the plug or tube before the latter has been inserted.
Figure 3:
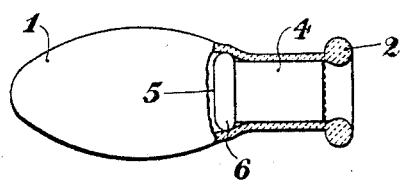
Figure 3 represents a part-sectional view showing the manner in which the plug or tube is inserted into the mouth of the teat to permit of the beading around the mouth being contracted and introduced through the hole in the guard.
Figure 4:
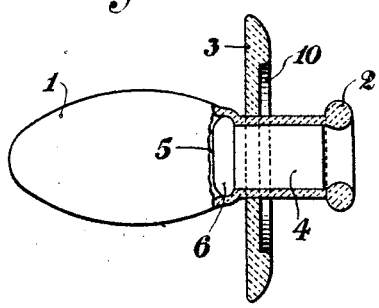
Figure 4 is a view of the teat after the guard has been engaged.
Figure 5:
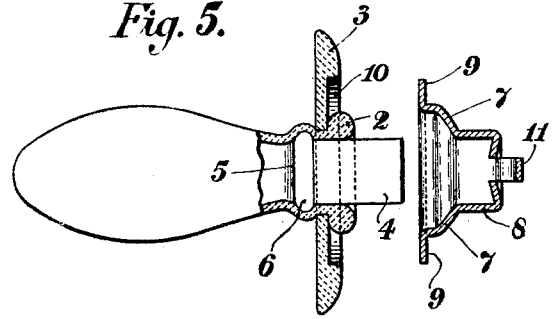
Figure 5 illustrates the manner in which the plug or tube is moved outwards, to cause the guard to fit closely between the beading around the mouth of the teat and the flange around the plug, the said figure also showing the cap or cover, in section, before it has been attached.

Referring to the drawings, the teat 1 is of the ordinary hollow india-rubber type, being preferably filled with a jelly-like substance or with a suitable fluid, the open end or mouth of the teat being formed with a solid annular rubber beading or lip 2. A shield 3 of bone, metal or other material is provided and in order to secure the said shield to the teat 1 a metal plug or tube 4 is employed of a cylindrical formation, the one end of the said plug or tube being open whilst its other end 5 is closed and is provided with an external circumferential flange or annular rib 6. The plug or tube 4, which may be of a slightly larger diameter than the inside diameter of the teat neck, is first inserted fully within the said neck with its closed flanged end 5 directed towards the outer closed end of the teat, so that its outer open end is situated inwards of the beaded edge 2 of the latter, as shown in Figure 3. The beaded edge 2, which lies clear of the metal tube 4 is now contracted or folded in and is passed through the central hole in the shield 3, which is threaded on to the neck as shown in Figure 4. In order to fix the shield 3 in its correct position so that it is prevented from being detached, the inner plug or tube 4 is now moved outwards so as to bring the flange or rib 6 around its inner end nearer to the beading 2 around the outer end or mouth of the teat, in such a manner that the said flange or annular rib engages, through the medium of the rubber wall of the teat, the one face of the guard 3, moving the latter outwards until it fits closely against the rubber beading 2, which engages its opposite face. The tube 4 effectively prevents the beading 2 from being contracted to permit of the detachment of the guard, whilst the flange or rib 6 around the inner end of the tube is such a diameter that it is impossible to move the guard over the rib when covered by the teat wall. Owing to the tube 4 being closed at one end it also serves effectively to seal the teat and prevent the contents from escaping. The rib 6 may be of a slightly larger diameter if desired, whilst it may be arranged so that the tube forces the rubber beading 2 slightly outwards. The metal plug or tube 4 is prevented from being moved inwards by means of a metal cap or cover 7 terminating in a cylindrical end-portion 8 which is arranged to fit closely over the projecting end of the tube, the said cap 7 having an integral outwardly-extending flange 9 arranged to abut against the outer face of the guard 3 which is formed with a circular recess or sunken portion 10 to receive it. The tubular portion 8 of the cap has a closed outer end 13 engaging the end of the tube 4 and an eye 11 is stamped up out of the said end 13 for the attachment of the usual cord or string. When the tubular end portion 8 of the cap has been fitted over the the projecting end of the plug or tube 4 in the above manner, so that the flange 9 fits within the recess 10 in the outer face of the guard, the said tubular portion is indented at 12, preferably at opposite points, the indentations forcing in the metal of the sleeve and giving a secure attachment. The tube is thus held securely in place and the guard is at the same time more firmly attached to the neck of the teat, the cap being preferably arranged to press against the rubber bead 2 around the neck in the manner illustrated in Figure 1. By the above method of attachment the guard cannot become inadvertently detached, whilst there is no danger of the rubber being injured.

The cap or cover may be of any suitable shape, whilst it may be fixed upon the tube by forming an annular groove around the two parts.

Having fully described my invention, what I desire to claim and secure by Letters Patent is:—

1. An infant's soother comprising a teat, a beading around the mouth of the teat, a plain cylindrical tube having one end closed and disposed within the mouth of the teat with the outer open end of said tube projecting from said mouth, an annular peripheral flange around the inner portion of the tube adjacent the closed end of the latter, a guard member closely surrounding the mouth of the teat and held between the beading of the teat and the annular peripheral flange of the tube, and a sheet-metal stamped cap having a cylindrical part fitting closely over the projecting open end of the tube and permanently secured thereto by indenting the walls of the said cylindrical part into the walls of the tube, the said cap also having at the inner end of the cylindrical part an integral flared outer portion engaging the rear face of the guard member, and at the outer end of the cylindrical part an integral eye.

2. An infant's soother comprising a teat, a beading around the mouth of the teat, a plain cylindrical closure member disposed within the mouth of the teat so as to project from said mouth and having a peripheral projecting part around its inner end, a guard member closely surrounding the mouth of the teat and held between the beading of the teat and the peripheral projecting part of the closure member, and a sheet-metal stamped cap having a cylindrical part fitting closely over the projecting end of the closure member and permanently secured thereto by indenting the walls of the said cylindrical part into the closure member, the said cap also having at the inner end of the cylindrical part an integral flared outer portion engaging the rear face of the guard member and at the outer end of the cylindrical part a closed end engaging the end of the closure member.

3. An infant's soother comprising a teat, a beading around the mouth of the teat, a plain cylindrical closure member disposed within the mouth of the teat so as to project from said mouth and having a peripheral projecting part around its inner end, a guard member closely surrounding the mouth of the teat and held between the beading of the teat and the peripheral projecting part of the closure member, and a sheet-metal stamped cap having a cylindrical part fitting closely over the projecting end of the closure member and permanently secured thereto by indenting the walls of the said cylindrical part into the closure member, the said cap also having at the inner end of the cylindrical part an integral flared outer portion engaging the rear face of the guard member and at the outer end of the cylindrical part a closed end engaging the end of the closure member, and an integral eye struck up out of the said closed end.

In testimony whereof I have hereunto set my hand.

FREDERICK SCHUTZE.